UNITED STATES PATENT OFFICE.

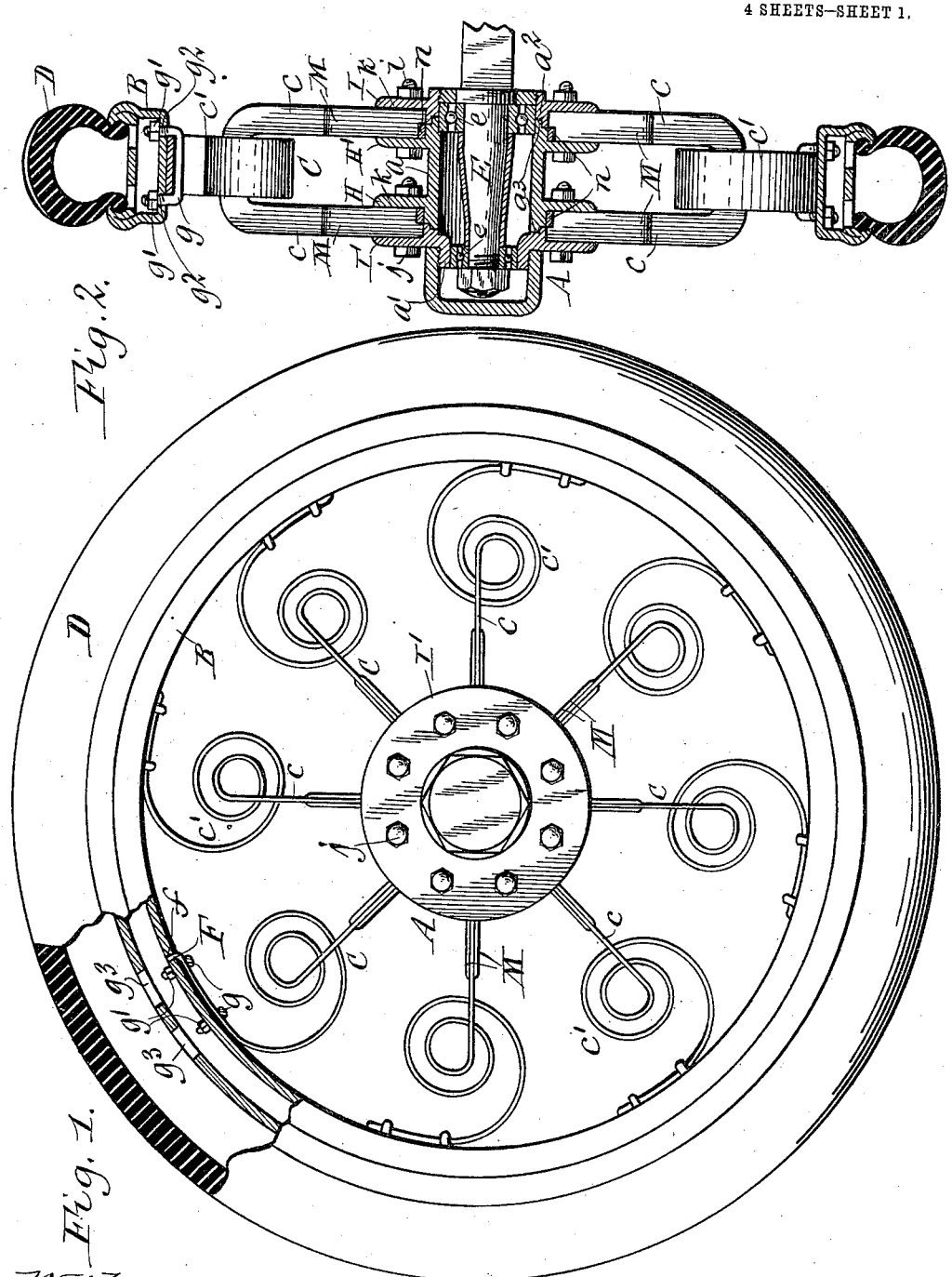

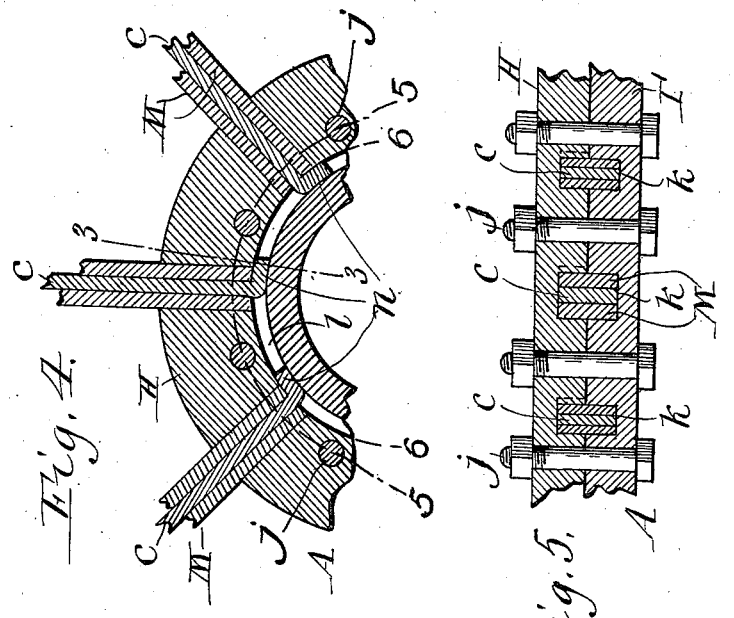

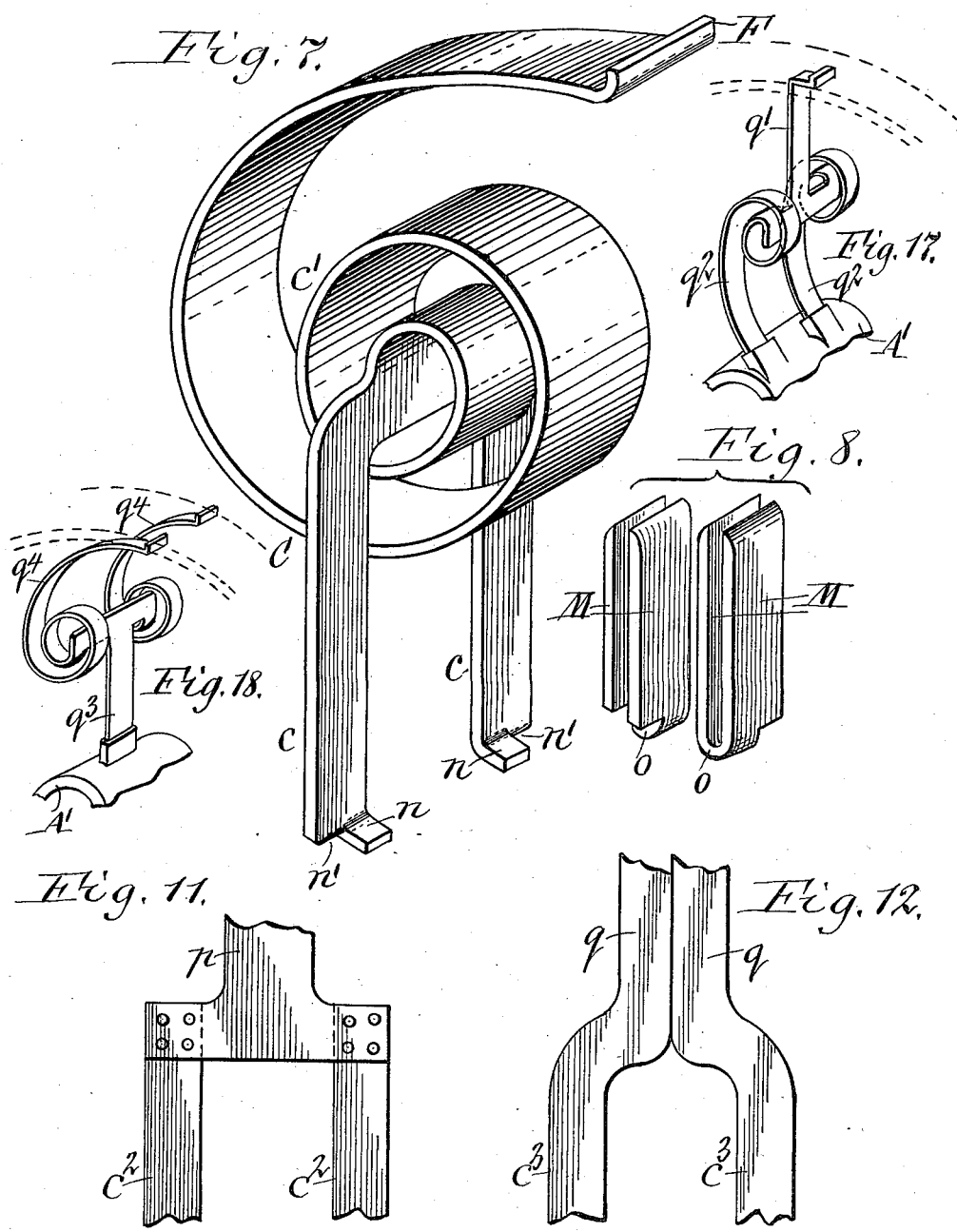

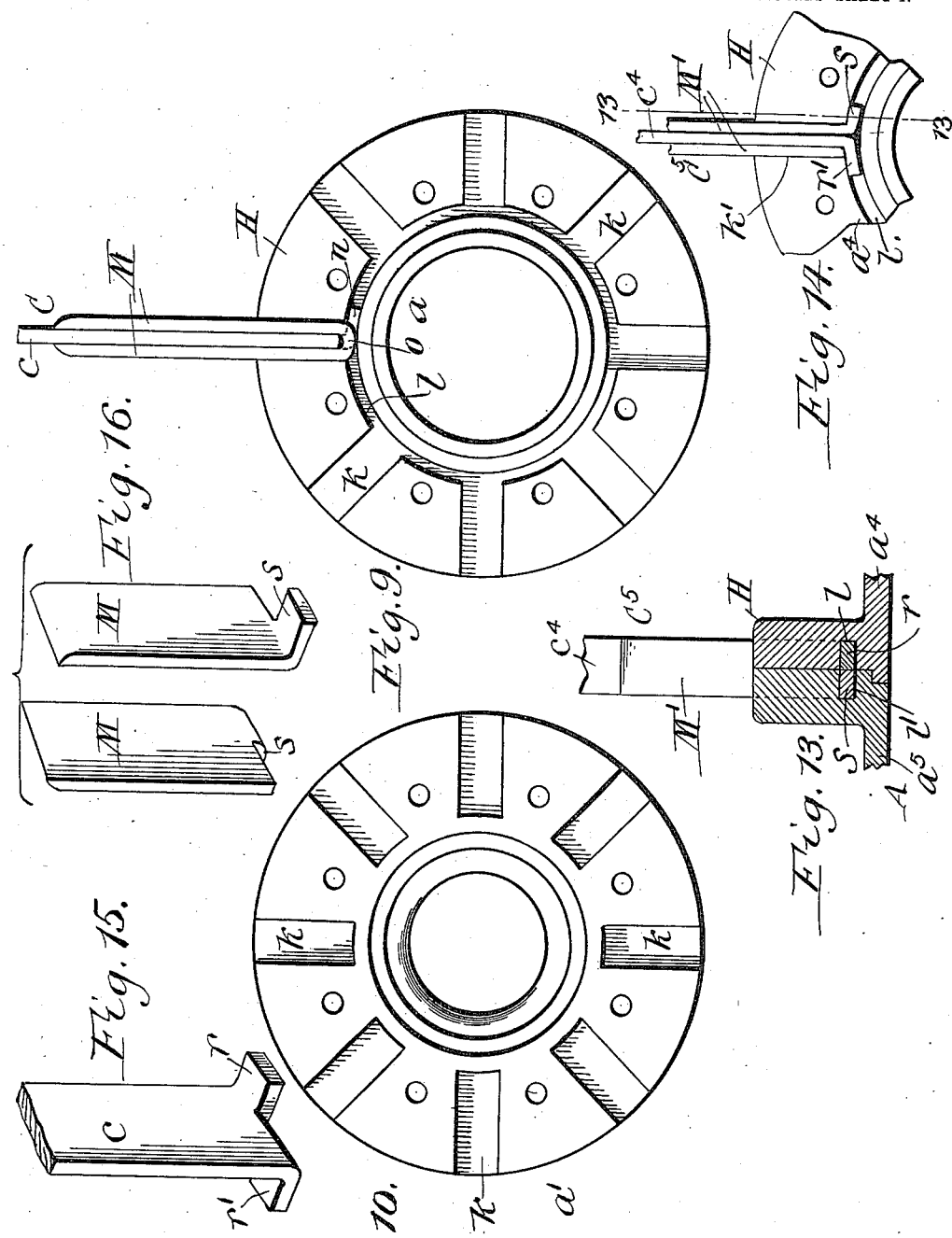

CHARLES H. BICALKY, OF BUFFALO, NEW YORK.

SPRING-WHEEL.

1,045,363.        Specification of Letters Patent.      Patented Nov. 26, 1912.

Application filed February 26, 1909. Serial No. 480,212.

*To all whom it may concern:*

Be it known that I, CHARLES H. BICALKY, a citizen of the United States, residing at Buffalo, in the county of Erie and State of New York, have invented a new and useful Improvement in Spring-Wheels, of which the following is a specification.

The object of this invention is the production of a spring wheel or pulley which will yieldingly support the load imposed on the same with ease, which is rigid against lateral strains to which the wheel or pulley is subjected, and which is of simple and inexpensive construction, not liable to get out of order, and easily dismembered or assembled when necessary for inspection or repairs.

In the accompanying drawings consisting of 4 sheets: Figure 1 is a side elevation of my improvements applied to a vehicle wheel, a part of the rim and tire being broken away. Fig. 2 is a vertical cross section of the same. Fig. 3 is a vertical cross section, on an enlarged scale, of a part of the hub and the adjacent part of one of the spokes taken in line 3—3, Fig. 4. Fig. 4 is a fragmentary longitudinal section in line 4—4, Fig. 3. Figs. 5 and 6 are fragmentary sections in the correspondingly numbered lines in Fig. 4. Fig. 7 is a perspective view of the form of spoke shown in Figs. 1–6. Fig. 8 is a similar view of the supplemental or reinforcing springs of a spring spoke. Figs. 9 and 10 are detached inner face views of the intermediate and one of the outer hub sections in connection with one of the spokes and its supplemental springs. Figs. 11 and 12 are fragmentary views showing modified forms of the spring spokes. Fig. 13 is a fragmentary cross section in line 13—13, Fig. 14, showing a modification of the means for connecting the spokes, supplemental springs and the hub. Fig. 14 is a face view of the intermediate hub section, spoke and reinforcing springs, shown in Fig. 13. Fig. 15 is a perspective view of the inner end of the spoke shown in Figs. 13 and 14. Fig. 16 is a similar view of a pair of reinforcing springs used in connection with the form of spoke shown in Figs. 13 and 14. Figs. 17 and 18 are perspective views showing additional modifications in the structure of spring spokes embodying my invention.

Similar letters of reference indicate corresponding parts throughout the several views.

My improvements are applicable to vehicle wheels, belt pulleys or friction wheels but in the following description and in the accompanying drawings the same are shown in connection with a vehicle or automobile wheel.

In its general organization my improved wheel or pulley comprises a hub A, a rim B, a plurality of spokes C connecting the hub and rim, and a tire D surrounding the rim.

The hub may be variously constructed and mounted to turn on the axle arm E in any suitable manner. The form of hub shown in Figs. 1–6, 9 and 10 comprises a tubular intermediate section $a$, an outer end section $a^1$ and an inner end section $a^2$, the inner and outer sections interlocking with the intermediate section by means of annular rabbet joints $a^3$, as shown in Figs. 2 and 3. Ball bearings $e$ are preferably interposed between the hub and axle arm, but if desired the hub may turn directly on the axle arm. The rim may be of any suitable construction to support the tire and permit of conveniently connecting the outer ends of the spokes therewith. As shown, this rim is constructed of sheet metal, so that it is of hollow or tubular form.

Each of the spring spokes comprises an inner bifurcated part forming a pair of inner straight legs $c$ which are preferably arranged radially and parallel side by side in the direction of the axis of the wheel and which are secured at their inner ends to the periphery of the hub, and an outer volute shaped part forming an arm $c^1$ which has its convolutions arranged between the legs and is connected at its inner end with the outer end of the legs while its outer end is connected with the rim. In the preferred form of spring spoke, shown in Fig. 7, the legs and arms thereof are formed of a single piece of flat steel the side of which is parallel with the axis of the wheel. Although the means of connecting the outer end of the spoke arm to the rim may be varied,— the means shown for this purpose in Figs. 1 and 2 are suitable and consist of an integral locking lug or lip F turned outwardly at the outer end of the spoke arm and engaging with a seat $f$ having the form of a depression or an opening in the inner side of the rim, and one or more transverse clips $g$ embracing the spoke arm beyond the anchoring lug and having its ends secured in openings $g^2$ in the inner part of the rim by means of screw nuts $g^1$ passed through openings $g^3$ in the outer part of the rim and applied to the clip ends within the rim, as shown in Figs. 1 and 2.

By arranging the legs of the spokes radially a pressure applied to the wheel parallel with a pair of legs causes the spring arms thereof to be strained but when a pressure is applied to the wheel at an angle to a pair of spoke legs then the latter are also strained.

By arranging the spokes with their flat sides parallel with the axis of the wheel, the same are very stiff in the direction of the axis of the wheel and effectually resist any lateral strains which tend to displace the rim and hub in this direction, thereby producing a strong and serviceable wheel and one which is capable of withstanding hard usage, thus rendering this wheel particularly suitable for use on automobiles.

The preferred means for connecting the inner ends of the spoke legs with the hub shown in Figs. 2–10 are constructed as follows:—$H^1$, H represent inner and outer annular flanges formed on the inner and outer parts of the intermediate section of the hub, and I, $I^1$ represent annular flanges formed on the inner and outer end hub sections, respectively. The flange I of the inner hub section bears against the inner flange $H^1$ of the intermediate section and is secured thereto by an annular row of bolts $i$ or other fastenings while the flange $I^1$ bears against the outer flange of the intermediate hub section and is secured thereto by an annular row of bolts $j$ or other fastening. Between each flange of the intermediate hub section and the flange of the adjacent end hub section is formed an annular row of radial sockets $k$, each of which is preferably formed partly in one of these flanges and partly in the companion flange. One of these flanges, preferably the one on the intermediate hub section, is provided with circumferentially extending shoulders or seats at the inner ends of the sockets $k$ which seats are preferably constructed by forming an annular groove $l$ in the face of the respective flange, so as to intersect the sockets, as shown in Figs. 4 and 9. Each of the sockets receives the inner part of one of the spoke legs and also the inner parts of two flat supplementary or reinforcing springs M which are arranged flatwise on opposite flat sides of the leg and serve to reinforce the leg of the spoke. The inner end of each leg is provided with a circumferentially extending locking toe or lug $n$ which is preferably formed integrally thereon by bending and which engages with the circumferential seat, so as to serve as an anchor or lock, whereby the spoke leg is prevented from being withdrawn from the socket of the hub. The locking lug $n$ is preferably arranged only adjacent to one edge of the leg at the inner end thereof, leaving a gap or space $n^1$ between the inner end of the leg and the bottom of the respective socket adjacent to the other edge of the leg. In this gap is arranged a bow or neck $o$ which connects the adjacent inner edges of the supplemental springs and thus locks the same against outward movement in the respective socket. Those portions of the inner edges of the supplemental springs in line with the locking lug of the spoke leg are not connected. This means for securing the spokes and reinforcing springs to the hub is very strong, durable and reliable and can be produced at comparatively small cost.

Instead of making the spoke of one piece of metal, as shown in Fig. 7, the legs $c^2$ and arm $p$ may be constructed of separate pieces which are secured together by riveting, as shown in Fig. 11 or otherwise.

Another way of making the spring spokes consists in making the same of two sections each of which comprises one of the legs $C^3$ and one half $q$ of the spring arm, as shown in Fig. 12.

If desired, the legs $c^4$ of each spoke $C^5$ may be locked in the sockets $k^1$ of the hub $a^4$, $a^5$ sections by means of locking lugs $r$, $r^1$ projecting in opposite directions from the inner end of each leg into annular locking grooves or seats $l$, $l^1$ formed in the companion hub flanges at the inner ends of their sockets $k^1$, as shown in Figs. 13, 14 and 15. In this construction, the locking lug on each side of the leg projects only part way across one side of the leg, leaving a space in the other locking groove adjacent to the remaining part of this side of the leg which is engaged by a locking lug $s$ projecting circumferentially from the inner end of the respective reinforcing spring $M^1$ and operating to hold the latter in the socket of the hub. In this last mentioned construction the reinforcing springs of each leg are not connected, as shown in Fig. 16, but are locked individually against displacement in the hub sockets.

In the construction of the spring spoke shown in Fig. 17, the outer single branch or arm $q^1$ secured to the wheel rim is straight and arranged radially while the legs $q^2$, $q^2$ of the inner bifurcated part of the spoke secured to the hub $A^1$ are each constructed in the form of a volute.

Substantially the same effect is produced by providing the spring spoke with a single straight radial inner arm or branch $q^3$ adapted to be secured to the hub $A^1$ and two volute-shaped outer arms or legs $q^4$ which are adapted to be secured to the rim, as shown in Fig. 18.

Although my invention is shown in the drawings as applied to a wheel it is obviously applicable to pulleys and the like and my invention is intended to comprehend such structures.

I claim as my invention:

1. A spring wheel comprising a hub, a hollow rim, and a plurality of spring spokes connecting the hub and rim, each of said spokes having its outer end secured to the rim by means of a lug projecting outwardly from the spoke into a seat in the rim, and a clamping device connecting the spoke and rim consisting of a clip embracing the spoke adjacent to said lug and having its ends secured in the rim by screw nuts arranged within the rim.

2. A spring wheel comprising a hub, a rim, a plurality of spring spokes connecting the hub and rim, and reinforcing springs arranged adjacent to the inner parts of the spokes, said hub having a plurality of sockets each of which receives the inner part of one spoke and its reinforcing spring, the inner part of each spoke and its reinforcing spring being arranged radially while the outer part of the spoke has the form of a volute and arranged with its center in line with the straight inner part of the spoke and the reinforcing spring.

3. A spring wheel comprising a hub, a rim, a plurality of spring spokes connecting the hub and rim and reinforcing springs arranged on opposite sides of the inner part of each spoke, the inner end of each spoke having a locking lug and the inner ends of the respective reinforcing springs being connected by a bow extending across the lower end of the spoke, and said hub having a plurality of sockets, each of which receives the inner parts of one of said spokes and its companion reinforcing springs, and a shoulder adjacent to said sockets with which said locking lugs of the spokes engage.

4. A spring wheel comprising a hub, a rim, a plurality of spring spokes connecting the hub and rim, and reinforcing springs arranged on opposite sides of the inner part of each spoke, the inner end of each spoke having a locking lug adjacent to one of its edges and the inner ends of the respective reinforcing springs being connected by a bow which extends across the inner end of the respective spoke adjacent to its other edge.

Witness my hand this 25th day of February, 1909.

CHARLES H. BICALKY.

Witnesses:
 THEO. L. POPP,
 ANNA HEIGIS.

Copies of this patent may be obtained for five cents each, by addressing the "Commissioner of Patents, Washington, D. C."